United States Patent
Mallinar et al.

(10) Patent No.: US 11,182,557 B2
(45) Date of Patent: Nov. 23, 2021

(54) DRIVING INTENT EXPANSION VIA ANOMALY DETECTION IN A MODULAR CONVERSATIONAL SYSTEM

(71) Applicant: International Business Machines Corporation, Armonk, NY (US)

(72) Inventors: Neil R. Mallinar, Long Island City, NY (US); Tin Kam Ho, Millburn, NJ (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 16/180,613

(22) Filed: Nov. 5, 2018

(65) Prior Publication Data

US 2020/0142959 A1 May 7, 2020

(51) Int. Cl.
*G06N 20/00* (2019.01)
*H04L 29/06* (2006.01)
*G06N 7/00* (2006.01)
*G06F 40/30* (2020.01)
*G06F 16/2457* (2019.01)

(52) U.S. Cl.
CPC ........ *G06F 40/30* (2020.01); *G06F 16/24578* (2019.01); *G06N 20/00* (2019.01)

(58) Field of Classification Search
CPC .... G06F 40/30; G06F 16/24578; G06N 20/00
USPC .................................................. 704/201, 230
See application file for complete search history.

(56) References Cited

U.S. PATENT DOCUMENTS

| | | | | |
|---|---|---|---|---|
| 5,963,940 A | * | 10/1999 | Liddy | G06F 16/3329 |
| 5,974,412 A | * | 10/1999 | Hazlehurst | G06F 16/3332 |
| 6,574,596 B2 | * | 6/2003 | Bi | G10L 15/10 |
| | | | | 704/249 |
| 6,718,302 B1 | * | 4/2004 | Wu | G10L 25/87 |
| | | | | 381/94.3 |
| 6,757,361 B2 | * | 6/2004 | Blair | G10L 15/26 |
| | | | | 379/67.1 |
| 6,941,301 B2 | * | 9/2005 | Ferguson | G06K 9/00503 |
| 7,117,207 B1 | * | 10/2006 | Kerschberg | G06F 16/337 |

(Continued)

OTHER PUBLICATIONS

IBM, "List of IBM Patents or Patent Applications Treated As Related," for U.S. Appl. No. 16/180,613, titled "Driving Intent Expansion Via Anomaly Detection in a Modular Conversational System," filed Nov. 5, 2018.

*Primary Examiner* — Akwasi M Sarpong
(74) *Attorney, Agent, or Firm* — Patterson + Sheridan, LLP

(57) ABSTRACT

Embodiments provide for driving intent expansion via anomaly detection by ranking, according to anomaly scores, a plurality of historic utterances that have been associated by a classifier with a given intent of a plurality of predefined intents; identifying a given utterance from the plurality of historic utterances having a given anomaly score greater than an anomaly threshold; in response to verifying that the given utterance is associated with the given intent, adding the given utterance to a training dataset as a positive example for the given intent; and in response to verifying that the given utterance is not associated with the given intent, adding the given utterance to the training dataset as a complement example for the given intent. A complement example for one intent may be added as a positive example for a different intent. The training dataset may be used to train or retrain an intent classifier.

20 Claims, 8 Drawing Sheets

(56) References Cited

U.S. PATENT DOCUMENTS

| | | | |
|---|---|---|---|
| 8,374,869 B2* | 2/2013 | Kang | G10L 15/187 |
| | | | 704/251 |
| 8,898,140 B2 | 11/2014 | Cooper et al. | |
| 9,418,117 B1* | 8/2016 | Molina | G06F 16/24578 |
| 9,538,007 B1 | 1/2017 | Mariappan | H04M 3/5232 |
| 9,691,395 B1* | 6/2017 | Sieracki | G10L 21/0272 |
| 9,858,257 B1* | 1/2018 | Hamaker | G06N 20/00 |
| 10,489,393 B1* | 11/2019 | Mittal | G06F 16/243 |
| 10,489,817 B2* | 11/2019 | Perkins | G06Q 50/01 |
| 10,545,966 B1 | 1/2020 | Molina | H04L 51/32 |
| 10,574,598 B2* | 2/2020 | Baudart | G06N 20/20 |
| 10,789,943 B1* | 9/2020 | Lapshina | G06F 40/205 |
| 10,810,510 B2* | 10/2020 | Angel | H04L 63/1408 |
| 10,943,583 B1* | 3/2021 | Gandhe | G10L 15/18 |
| 2003/0129986 A1* | 7/2003 | Blair | G10L 17/26 |
| | | | 455/450 |
| 2004/0148170 A1 | 7/2004 | Acero et al. | |
| 2006/0037080 A1 | 2/2006 | Maloof | |
| 2007/0040813 A1* | 2/2007 | Kushler | G06F 3/04883 |
| | | | 345/173 |
| 2009/0327260 A1 | 12/2009 | Li et al. | |
| 2012/0323877 A1* | 12/2012 | Ray | G06F 16/9535 |
| | | | 707/706 |
| 2014/0282493 A1* | 9/2014 | Glover | G06F 8/61 |
| | | | 717/176 |
| 2014/0379332 A1* | 12/2014 | Rodriguez | G10L 17/12 |
| | | | 704/219 |
| 2015/0006442 A1 | 1/2015 | Ogilvie et al. | |
| 2015/0332667 A1* | 11/2015 | Mason | G10L 25/81 |
| | | | 704/249 |
| 2016/0055132 A1 | 2/2016 | Garrison et al. | |
| 2016/0188574 A1* | 6/2016 | Homma | G06F 40/216 |
| | | | 704/9 |
| 2017/0039484 A1 | 2/2017 | Niemczyk et al. | |
| 2017/0124211 A1 | 5/2017 | Suter et al. | |
| 2018/0060326 A1 | 3/2018 | Kuo et al. | |
| 2018/0060755 A1 | 3/2018 | Green et al. | |
| 2018/0083893 A1* | 3/2018 | Viswanathan | G06F 40/295 |
| 2018/0232421 A1 | 8/2018 | Dialani et al. | |
| 2018/0285349 A1 | 10/2018 | Mineno et al. | |
| 2018/0357221 A1 | 12/2018 | Galitsky | |
| 2018/0357415 A1* | 12/2018 | Dhondse | G06F 21/554 |
| 2019/0035387 A1 | 1/2019 | Zitouni et al. | |
| 2019/0103095 A1* | 4/2019 | Singaraju | H04L 51/04 |
| 2019/0138595 A1 | 5/2019 | Galitsky | |
| 2019/0213502 A1* | 7/2019 | Navratil | G06N 20/00 |
| 2019/0213503 A1 | 7/2019 | Navratil et al. | |
| 2019/0266282 A1 | 8/2019 | Mitchell et al. | |
| 2019/0325864 A1* | 10/2019 | Anders | G06F 40/35 |
| 2020/0027157 A1* | 1/2020 | Xu | G06N 5/048 |
| 2020/0142960 A1 | 5/2020 | Shah et al. | |

\* cited by examiner

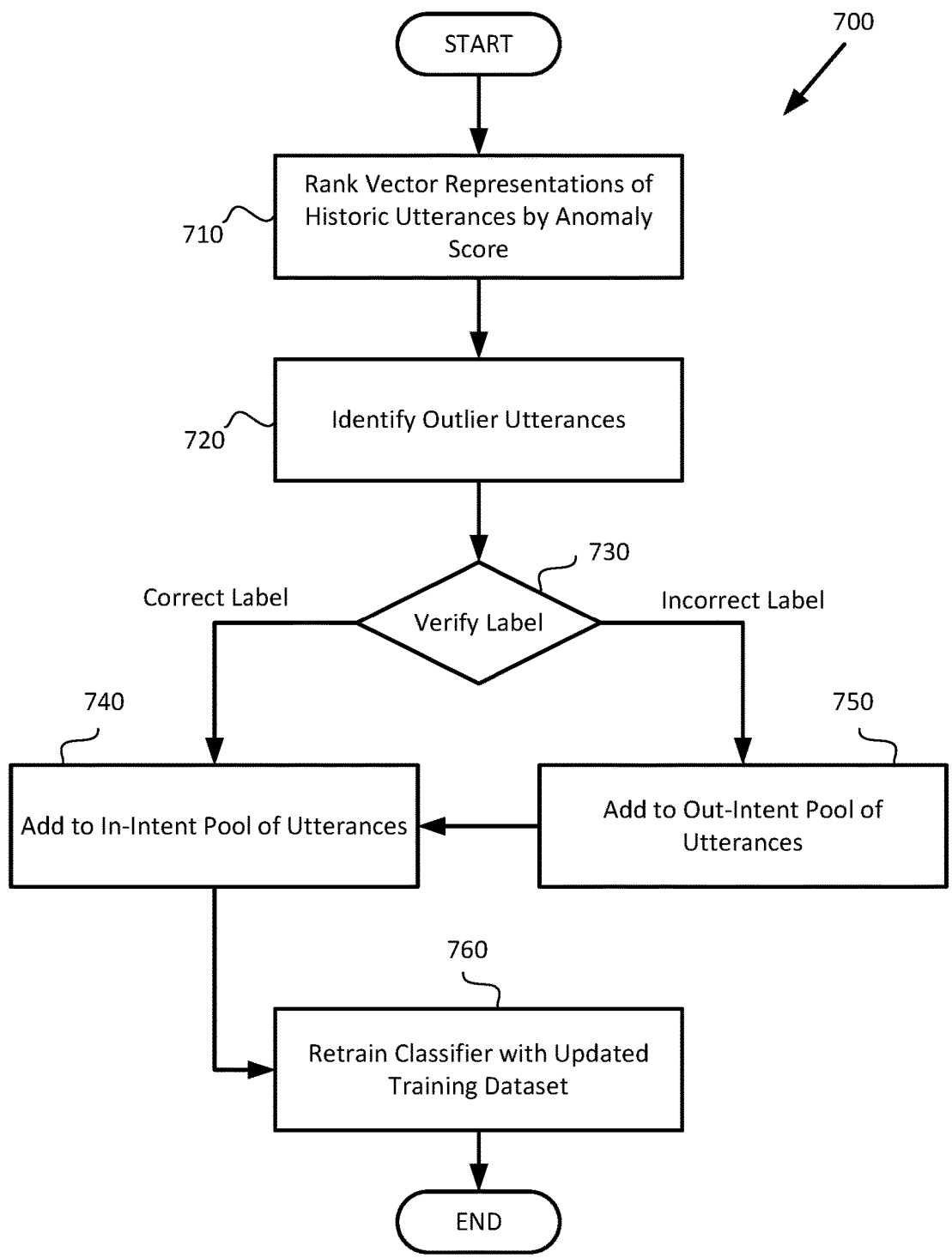

DRIVING INTENT EXPANSION VIA ANOMALY DETECTION IN A MODULAR CONVERSATIONAL SYSTEM

BACKGROUND

The present invention relates to training conversational models for use in Natural Language Processing (NLP), and more specifically, to expanding classifier training data sets. NLP models are trained to recognize the intent of a spoken or written communication that uses unstructured human-language (i.e., an utterance) based on the content, order, and context of words recognized in the communication. A developer indicates various intents that a user is expected to have when interacting with the NLP model, and supplies various decision and dialog trees that may be presented to a user who has indicated a particular intent. As unstructured human language communications may be ambiguous (e.g., due to homologues, colloquialisms, implied meanings, sentence ordering), NLP models include a classifier that is trained to recognize the intent of an utterance from the available intents specified by the developer. The classifier may determine the intent by various techniques so that a context-appropriate response is generate to communications from a user. The dataset used to train the classifier in an NLP model, however, affects the accuracy of a determined intent as much, or more than the technique chosen to recognize the intent; a classifier developed using a poorly constructed dataset for training will likely produce inaccurate results when determining intents in utterances.

SUMMARY

According to one embodiment of the present invention, a method for driving intent expansion via anomaly detection in a modular conversational system is provided, the method comprising: ranking according to anomaly scores, a plurality of historic utterances that have been associated by a classifier with a given intent of a plurality of predefined intents; identifying a given utterance from the plurality of historic utterances having a given anomaly score greater than an anomaly threshold; in response to verifying that the given utterance is associated with the given intent, adding the given utterance to a training dataset as a positive example for the given intent; and in response to verifying that the given utterance is not associated with the given intent, adding the given utterance to the training dataset as a complement example for the given intent.

According to one embodiment of the present invention, a computer readable storage medium instructions that when executed by a processor enable the processor to perform an operation for driving intent expansion via anomaly detection in a modular conversational system is provided, the operation comprising: ranking according to anomaly scores, a plurality of historic utterances that have been associated by a classifier with a given intent of a plurality of predefined intents; identifying a given utterance from the plurality of historic utterances having a given anomaly score greater than an anomaly threshold; in response to verifying that the given utterance is associated with the given intent, adding the given utterance to a training dataset as a positive example for the given intent; and in response to verifying that the given utterance is not associated with the given intent, adding the given utterance to the training dataset as a complement example for the given intent.

According to one embodiment of the present invention, a system for driving intent expansion via anomaly detection in a modular conversational system is provided, the system comprising: a processor; and a memory storage device including instructions that when executed by the processor, enable the processor to: rank, according to anomaly scores, a plurality of historic utterances that have been associated by a classifier with a given intent of a plurality of predefined intents; identify a given utterance from the plurality of historic utterances having a given anomaly score greater than an anomaly threshold; in response to verifying that the given utterance is associated with the given intent, add the given utterance to a training dataset as a positive example for the given intent; and in response to verifying that the given utterance is not associated with the given intent, add the given utterance to the training dataset as a complement example for the given intent.

BRIEF DESCRIPTION OF THE SEVERAL VIEWS OF THE DRAWINGS

FIG. 7 is a flowchart of a method for driving intent expansion via anomaly detection in a modular conversational system, according to an embodiment of the present disclosure,

DETAILED DESCRIPTION

Figure 1:
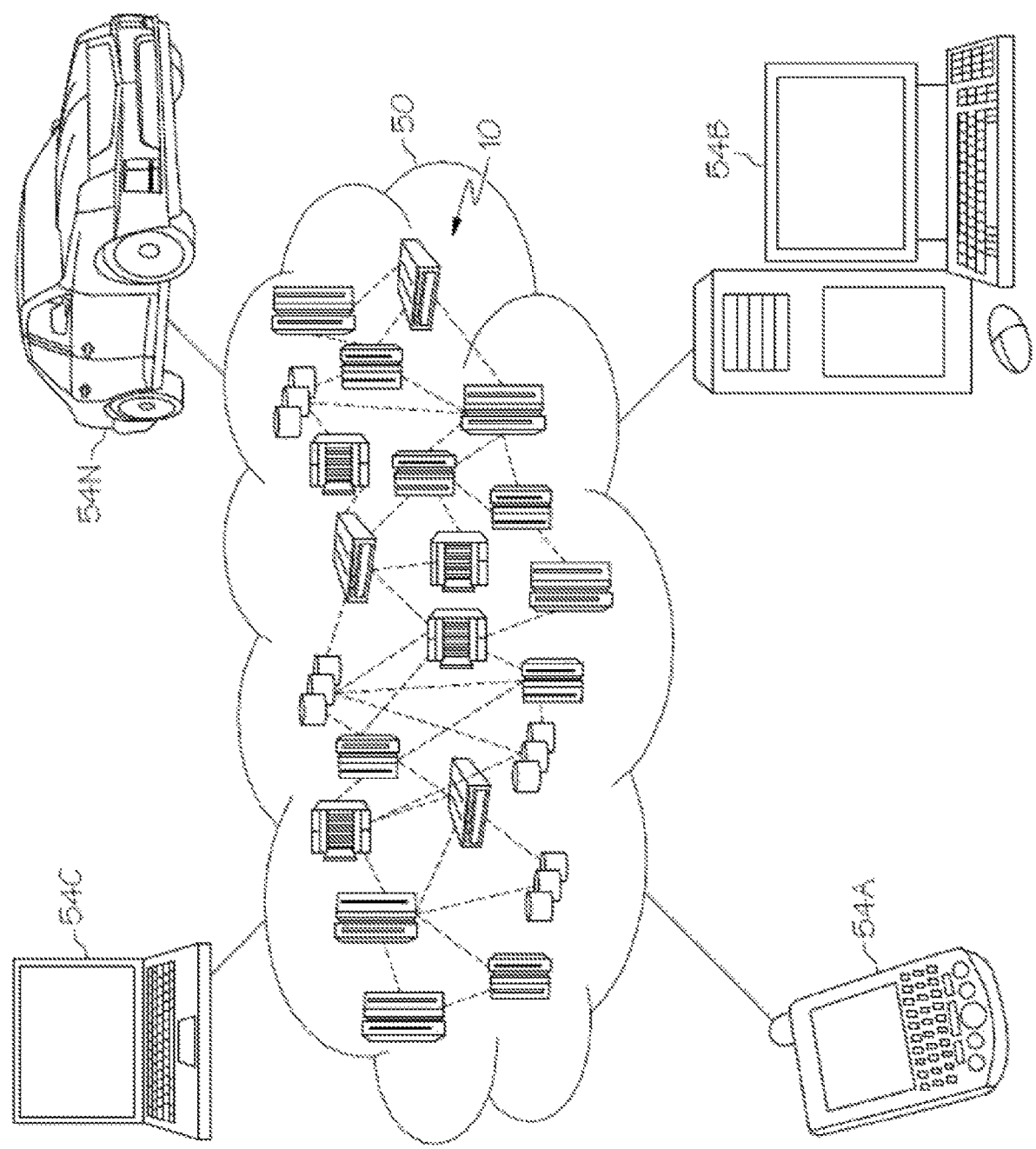
FIG. 1 depicts a cloud computing environment according to an embodiment of the present disclosure.

When training a classifier for use in a Natural Language Processing (NLP) model, such as a chatbot, to identify various intents that a user may express, a developer should provide a large and varied training dataset to the classifier. A large and varied training set, with examples that positively indicate a given intent and that do not indicate a given intent allows the classifier to identify features with an utterance that are positively associated with the given intent, are immaterial to association with the given intent, and that are negatively associated with the given intent.

In a training dataset used a supervised (or semi-supervised) learning process, individual data points are labeled with a correspondence to various intents. These labels are metadata that inform the model being trained how the data point should be classified relative to a given intent. For example, a first training data point may be a positive example for a given intent, and is labeled as such to enable the model to classify the first training data point as being associated with the given intent. In another example, a second training data point may be a negative example (also referred to as a complement) for a given intent, and is labeled as such to enable the model to classify the second training data point as not being associated with the given intent. Adding labels to data points may be labor and data intensive, and a developer may limit the size of the training dataset accordingly.

Given the semantic flexibility available in a natural language to formulate a query in different ways, providing a sufficiently varied training dataset to cover the myriad different formations that different users may apply to indicate the same intent is challenging. Developers may specify a training set with several training examples, but end users of the NLP model may provide real-world utterances outside of the training set that the NLP model, nevertheless, should respond to coherently.

The present disclosure provides improvements for computing devices in generating and populating training datasets that provide more accurate and broader examples. Using existing chat logs, the training dataset is built to include a pool of examples that are particularly unique to provide the model being trained with the most-difficult to handle responses in the training dataset. The developer searches a body of utterances classified to a given intent to identify the anomalous utterances within the body, which may have been properly or improperly assigned to a given intent. The developer verifies the classification of these anomalous utterances to the given intent and selects the verified utterances to add to the training dataset for retraining the classifier.

In this process the developer selects the most-unique examples to further improve the reliability of the training dataset, and the resulting accuracy of the models trained therefrom.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
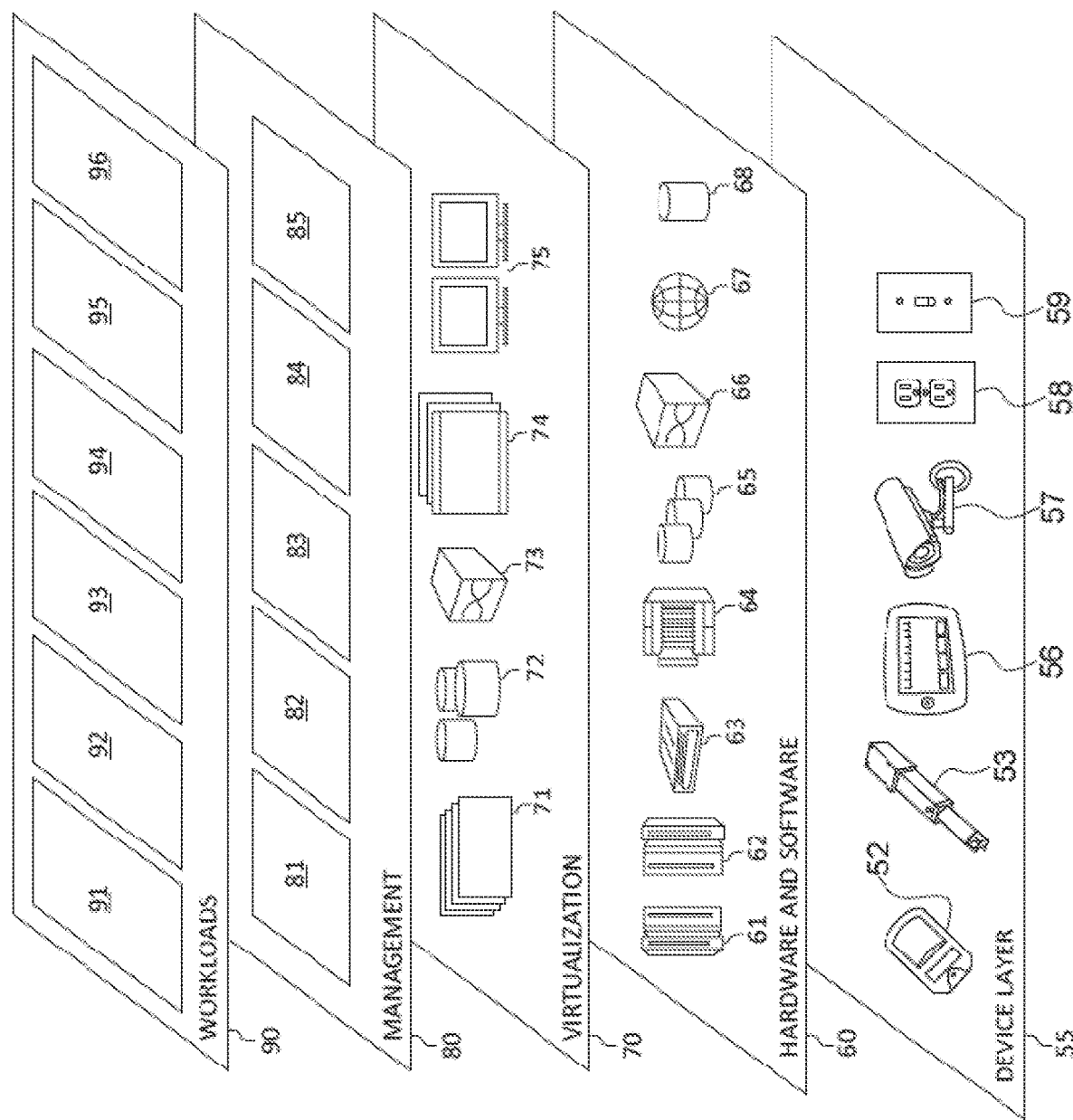
FIG. 2 depicts abstraction model layers according to an embodiment of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and building training datasets for intent classifiers 96.

Figure 3:
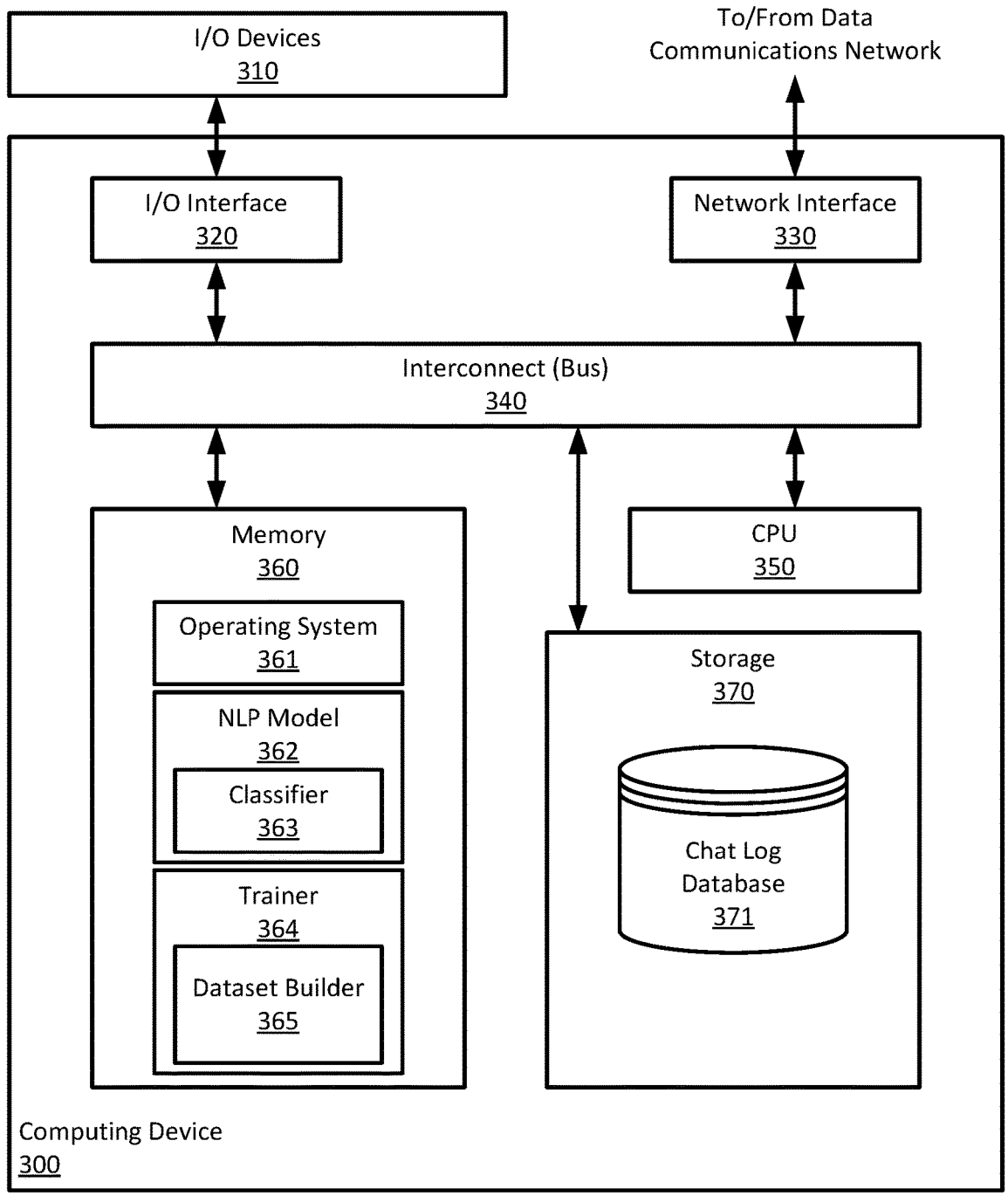
FIG. 3 illustrates a computing device for intent expansion via anomaly detection balancing for intent authoring via search, according to embodiments of the present disclosure.

FIG. 3 illustrates a computing system 300, such as a node 54 or device in the hardware and software layer 60, which may be a personal computer, a laptop, a tablet, a smartphone, etc. As shown, the computing system 300 includes, without limitation, a central processing unit (CPU) 350, a network interface 330, an interconnect 340, a memory 360, and storage 370. The computing system 300 may also include an I/O device interface 320 connecting I/O devices 310 (e.g., keyboard, display and mouse devices) to the computing system 300.

The CPU 350 retrieves and executes programming instructions stored in the memory 360. Similarly, the CPU 350 stores and retrieves application data residing in the memory 360. The interconnect 340 facilitates transmission, such as of programming instructions and application data, between the CPU 350, I/O device interface 320, storage 370, network interface 340, and memory 360. CPU 350 is included to be representative of a single CPU, multiple CPUs, a single CPU having multiple processing cores, and the like. And the memory 360 is generally included to be representative of a random access memory. The storage 370 may be a disk drive storage device. Although shown as a single unit, the storage 370 may be a combination of fixed and/or removable storage devices, such as magnetic disk drives, flash drives, removable memory cards or optical storage, network attached storage (NAS), or a storage area-network (SAN). The storage 370 may include both local storage devices and remote storage devices accessible via the network interface 330. One or more chat log databases 371 are maintained in the storage 370, which include various historical natural language utterances and responses (i.e., conversations) received from users. The conversations may include human-to-human interactions as well as human-to-chatbot interactions.

Further, computing system 300 is included to be representative of a physical computing system as well as virtual machine instances hosted on a set of underlying physical computing systems. Further still, although shown as a single computing system, one of ordinary skill in the art will recognized that the components of the computing system 300 shown in FIG. 3 may be distributed across multiple computing systems connected by a data communications network.

As shown, the memory 360 includes an operating system 361 (e.g., Microsoft's WINDOWS® Operating System), at least one NLP Model 362, including a classifier 363, and a trainer 364, including a dataset builder 365. The trainer 364 develops one or more NLP models 362, such as may be used by chatbots, that are trained with an associated classifier 363 to identify various intents from user utterances when deployed. A developer for the NLP model 362 may specify a set of intents that utterances from a user are to be mapped to by the classifier 363, and may provide various examples for use in training the classifier 363 and the NLP model 362.

The dataset builder 365 may include or be in communication with a vectorizer to map textual utterances into a numerical format for analysis. The dataset builder 365 analyzes the vectorized utterances to detect outliers in the data that are presented to a developer for further analysis. Once analyzed, the outlier utterances may be included in the training dataset that is used to update the classifier 363 in later iterations.

Figure 4A:
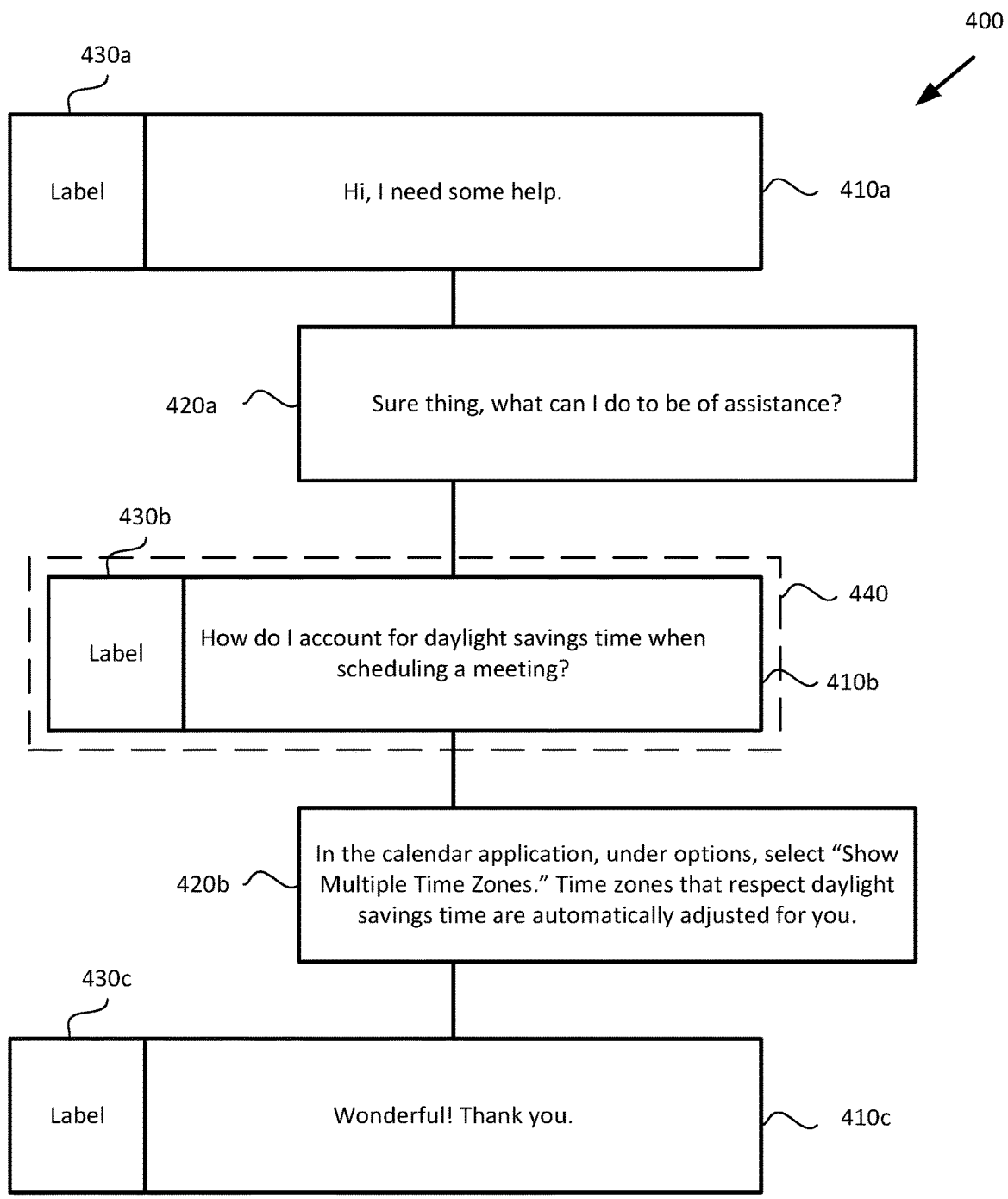
FIGS. 4A and 4B illustrate conversations, according to embodiments of the present disclosure.
Figure 4B:
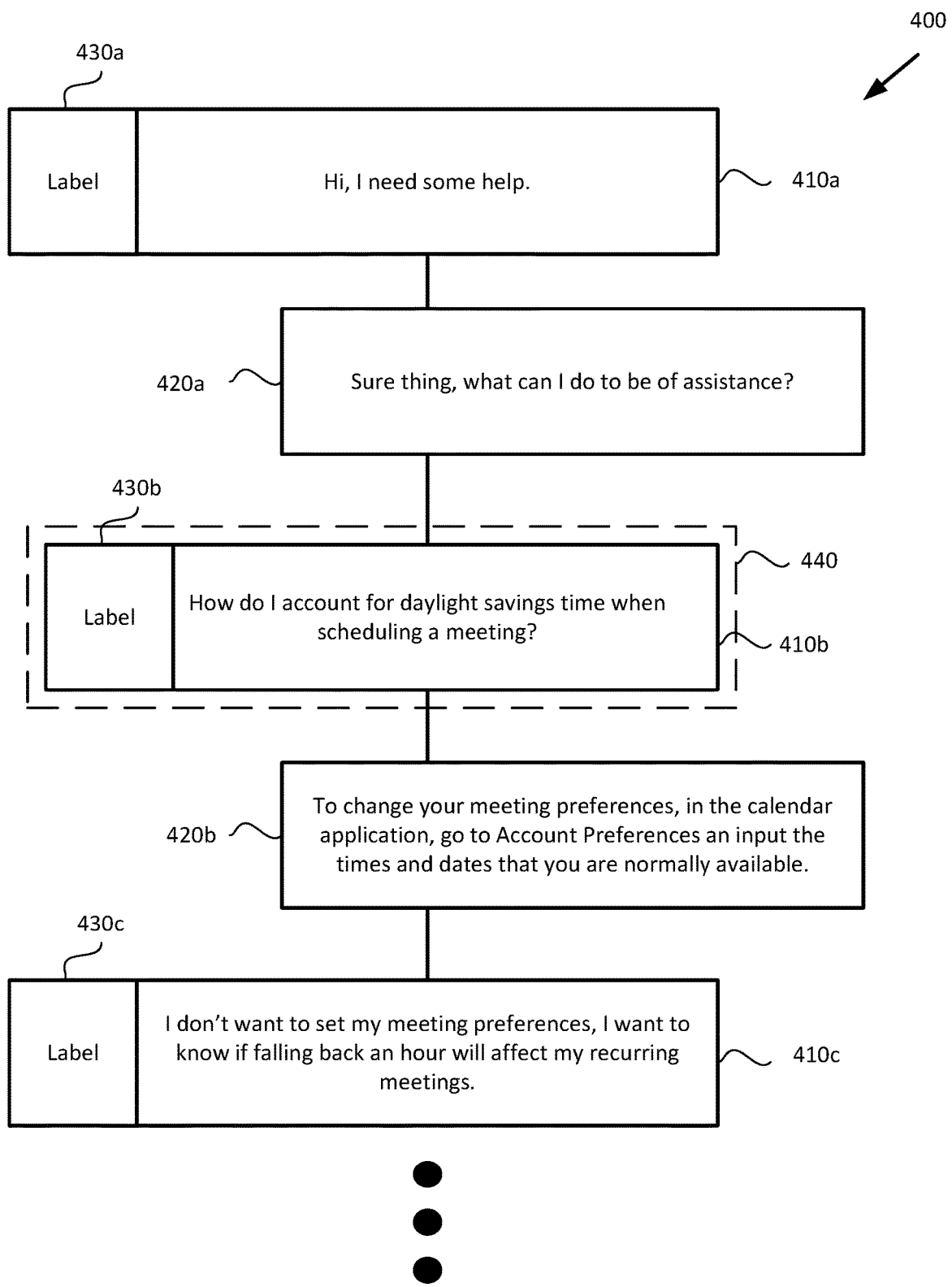

FIGS. 4A and 4B illustrate conversations 400 as may be stored in the chat log database 371. The conversations 400 may be between a human user and a human assistant or a human user and an NLP assistant, such as a chatbot, using an NLP model 362 to determine how to respond to the human user. The conversations 400 includes one or more utterances received from the human user as conversation inputs 410, and one or more conversation responses 420 from the assistant. Other example conversations 400 may include more or fewer utterances with different dialog.

Additionally, the conversations 400 may be conducted via text or audio, but are presented herein as text. When the conversations 400 are conducted via audio, the chat log database 371 may store the audio log along with a text conversion of the conversation 400. In some embodiments, the text stored in the chat log database 371 is normalized to remove special characters (e.g., line breaks, asterisks, punctuation) and to present the text in a constant case (e.g., majuscule "UPPER CASE" or miniscule "lower case"). Similarly, the conversations 400 may be compressed to remove words, phrases, or sounds that are determined to be fillers without semantic meaning (e.g., removing "um" from an English language audio).

When an NLP assistant generates the conversation responses 420 in a live conversation 400, the NLP assistant first determines an intent for the conversation input 410 using a trained classifier 363. Similarly, in a historic conversation 400, between a human user and a human or NLP assistant, the trained classifier 363 analyzes the conversation inputs 410 as historic utterances to determine the intent of the human user. The classifier 363 may assign one or more labels 430 to one or more conversation inputs 410 that reflect the determined intent for the particular conversation inputs 410. For example, in the conversation 400 illustrated in FIG. 4, the classifier 363 has assigned a first intent label 430a to the first conversation input 410a, a second intent label 430b to the second conversation input 410b, and a third intent label 430c to the third conversation input 410c.

In some embodiments, the classifier 363 identifies a root node 440 in the conversation 400. The root node 440 identifies the first indication from the user of a main purpose for the conversation 400. In various embodiments, the intent label 430 and position in the conversation 400 identifies the root node 440. Using the first conversation 400a in FIG. 4A as an example, the first label 430a may identify an intent of "introductory remark," the second label 430b may identify an intent of "calendar application operations", and the third label 430c may identify an intent of "sign off". In contrast, using the second conversation 400b in FIG. 4B, the first label 430a may identify an intent of "introductory remark," the second label 430b may identify an intent of "account settings—time preferences", and the third label 430c may identify an intent of "calendar application operations." Although the conversations 400a and 400b each begin with identical first conversation inputs 410a with an intent of "introductory remark," the classifier 363 may ignore certain classes of intents as not related to identifying a main purpose for the conversation 400. Each of the conversations 400a and 400b also have identical second conversation inputs 410b, which the classifier 363 has identified as the root node 440 for the conversations 400, but the classifier 363 has identified different intents in the respective second conversation inputs 410b. Whether the intent is correctly or incorrectly identified by the classifier 363 early in the conversation 400 affects the user experience, and identifying examples of actual historic conversation inputs 410 that are correctly and incorrectly assigned to an intent to include in a training dataset.

Figure 5:
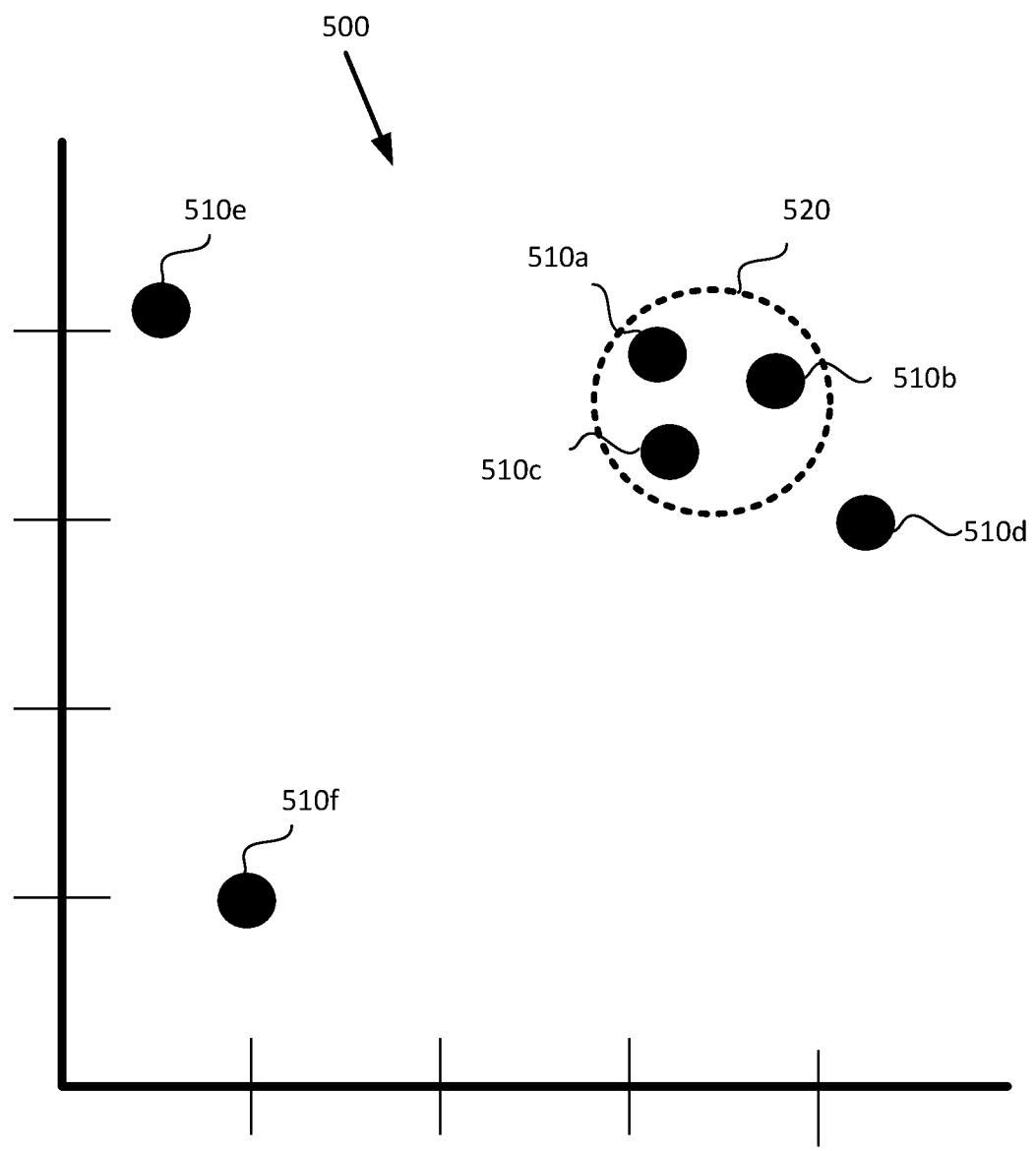
FIG. 5 illustrates a vector space, according to embodiments of the present disclosure.

FIG. 5 illustrates a vector plot 500 for several example utterances 510. Including too many similar examples in the training dataset may bias the classifier 363 or affect the ability of the classifier 363 to respond to outliers or atypically phrased requests from a user. Therefore, the dataset builder 365 identifies which examples selected from the root nodes 440 (whether correctly or incorrectly initially classified) to include in a training dataset, and may select a predefined number of examples to include in the training dataset. The examples may include a predefined number or percentage of outliers, inliers, and mandated examples. For example, a training dataset may include x examples provided by or selected by a developer (i.e., mandated examples), y examples that fall within a predefined range of similarity to one another as vector representations or fall within a predicted pattern (i.e., inlier examples), and z examples that fall outside of a predefined range of similarity to one another in a vector representations or fall outside of a predicted pattern (i.e., outlier examples). For example, the vectorizations of the first, second, and third example utterances 510a-c are inliers, as the values fall within the predefined range 520 shown in the vector plot 500, while the fourth, fifth, and sixth example utterances 50d-f are outliers as the values fall outside of the predefined range 520. Any of the example utterances 510a-f may be mandated or historic examples.

To allow numerical analysis of the textual data of the example utterances 510, the dataset builder 365 converts the text of the root nodes 440 into vector formats. In various embodiments, the dataset builder 365 uses one or more of word2vec, the enwiki 2015 document vectorizer, ppdb paragram sentence embeddings, common-crawl uncased GloVe word embeddings, and enwiki 2015 TF-IDF vectors to convert the text into vectors for numeric analysis. Although the vector plot 500 in FIG. 5 shows a two-dimensional vectorization that represents the text in two different dimensions (represented by the vertical and horizontal axes), other embodiments use multi-dimensional vectorizations using more than two dimensions to represent the text (e.g., word2vec uses 300 dimensions).

The dataset builder 365 identifies the example utterances 510 that are most anomalous compared to the set of example utterances 510 being evaluated based on various scoring schema. The scoring schema identify how different an individual utterance's vector is from the other vectors for the other utterances being evaluated in the multidimensional vector space. In some embodiments, the dataset builder 365 uses a cosine distance, a trained forest model, or a one-class support vector machine to determine the anomaly score, which may be understood as a distance in the multidimensional space away from the inlier utterances. In FIG. 5, the fourth example utterance 510d is closer to the inlier example utterances 510a-c in the predefined range 520 than the fifth and sixth example utterances 510e, 510f, and would therefore have a lower anomaly score than either of the fifth or sixth example utterances 510e, 510f. The dataset builder 365 prioritizes the most-anomalous utterances (i.e., the example utterances 510 having higher anomaly scores) for presentation to the developer and potential inclusion in the training dataset.

In various embodiments, the dataset builder 365 updates an existing training dataset with newly analyzed example utterances 510, while in other embodiments, the dataset builder 365 creates a new training set with the example utterances 510 analyzed. In various embodiments, the dataset builder 365 may analyze the example utterances included in a current training dataset as well as the utterances received within the last d days to update or create a new training dataset, and may examine the chat log database 171 every d days. In various embodiments, the chat log database 171 may clear the example utterances stored therein after analysis; thus preserving memory resources.

Figure 6:
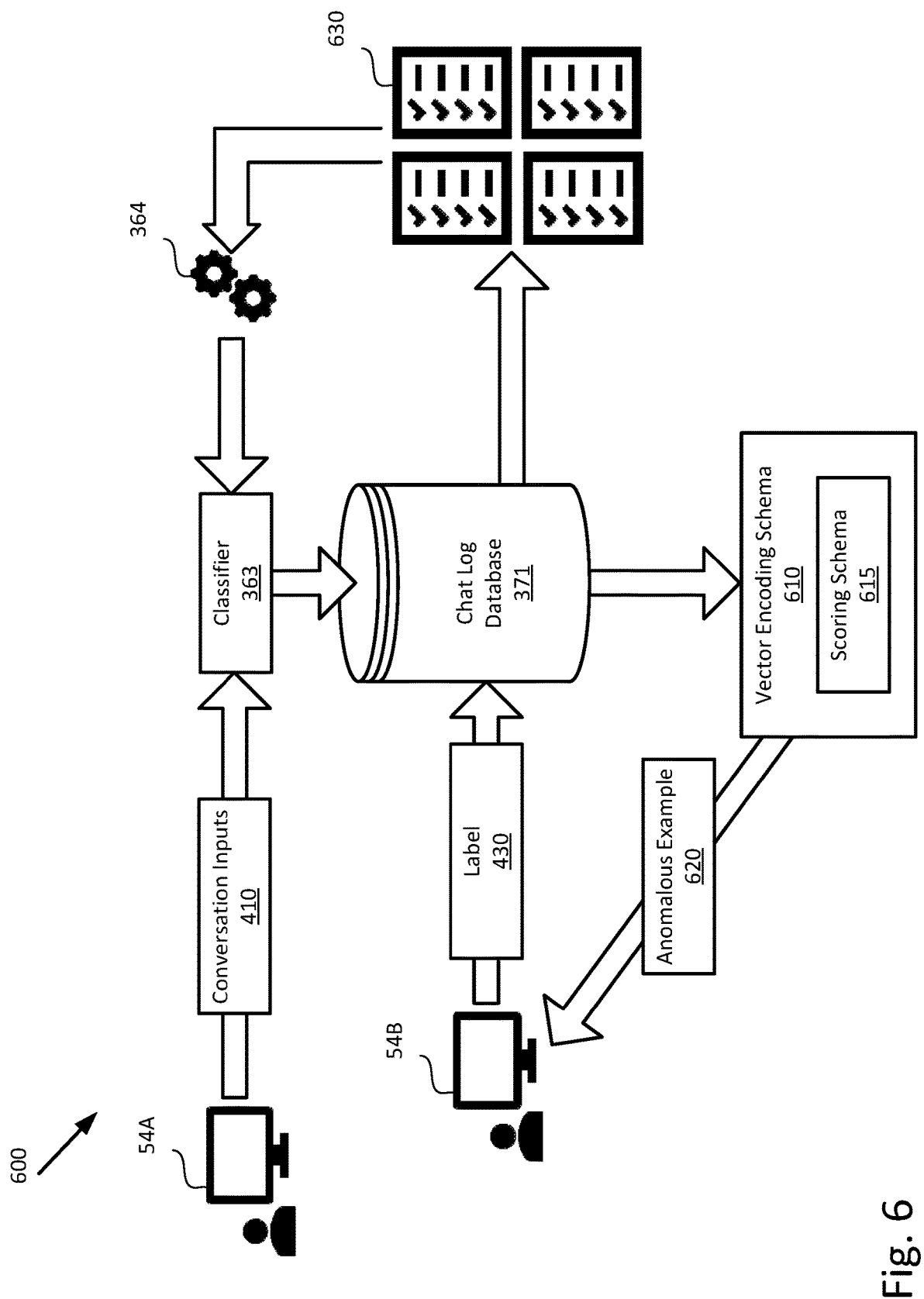
FIG. 6 illustrates a flow for driving intent expansion via anomaly detection in a modular conversational system, according to embodiments of the present disclosure.

FIG. 6 illustrates a flow for building a dataset 630, which may be understood in conjunction with the method 700 illustrated in FIG. 7. Various users submit, via nodes 54A, conversations inputs 410 that a classifier 363 determines an intent for. The classifier 363 is trained to identify which intent of a predefined set of intents the conversation input 410 is associated with, so that an NLP model 362 may intelligibly and coherently respond to the user in a natural language conversation. The conversation inputs 410 are stored, along with metadata including the determined intent, in a chat log database 371 as historic utterances.

In response to receiving a selection of a particular intent from a developer, via node 54B, the dataset builder 365 queries the chat log database 371 for the conversation inputs 410 received within the last d days associated with a matching intent. The root nodes 440 may include conversation inputs 410 that the classifier 363 correctly identified the intent for and conversation inputs 410 that the classifier 363 incorrectly identified the intent for.

The dataset builder 365 ranks vector representations of the historic utterances returned from the chat log database based on an anomaly score for the historic utterances (Block 710). The dataset builder 365 normalizes the text of the historic utterances (e.g., sets a case, removes non-alphanumeric characters) and passes the normalized text to one or more vector encoding schemas 610. Each vector encoding schema 610 creates a vector representation for each historic utterance, which enables the dataset builder 365 to numerically analyze the historic utterances. In embodiments that use multiple vector encoding schemas 610, the vector encoding schemas 610 votes on whether a given historical utterance is anomalous, such that at more than half of the encoding schemas 610 agree on an individual utterance being anomalous.

The database builder 365 identifies up to n historic utterances from this list of anomalous utterances as the anomalous examples 620 to be candidates for inclusion in the training dataset 630 (Block 720). Each of the vector encoding schemas 610 uses one or more scoring schema 615 to determine an anomaly score for the individual utterances relative to the body of historical utterances being analyzed. The anomaly scores indicate how different an individual utterance is from the other utterances in the vector space defined by the vector encoding schema 610. In various embodiments, the scoring schemas 615 include a cosine difference, a forest model, or a one class support vector machine. The vector encoding schemas 610 output an ordered list of the anomalous utterances, ranked accord according to the values of the anomaly scores. In embodiments using multiple scoring schemas 615 or vector encoding schemas 610, the order of the anomalous utterances may be based on a highest anomaly score reported, a lowest anomaly score reported, or an average anomaly score. The dataset builder 365 may select the n anomalous examples 620 from the n most-anomalous utterances, or may select all utterances having an anomaly score greater than an anomaly threshold.

The dataset builder 365 sends the anomalous examples 620 to the node 54B used by the developer for the developer to verify the label 430 associated with the anomalous examples 620 (Block 730). When the classifier 363 has correctly determined the intent of the anomalous example 620, the developer responds with the original label 430, and the dataset builder 365 adds the anomalous example 620 with the original label 430 to an in-intent pool of utterances of the training dataset 630 (Block 740). When the classifier 363 has incorrectly determined the intent of the anomalous example 620, the developer responds with a new label 430 that matches the correct intent for the anomalous example 620, and the dataset builder 365 optionally adds the anomalous example 620 with the new label 430 to one or more of an out-intent pool of utterances of the training dataset 630 for the intent associated with initial label 430 (Block 750) and the in-intent pool of the corrected intent in the training dataset 630 (Block 740). In various embodiments, the metadata associated with the anomalous examples 620 include the n next-most-likely intents that the classifier 363 considered assigning to the utterance in the anomalous example 620. A user interface may present the n next-most-likely intents to the developer to choose from when selecting a new intent.

The dataset builder 365 constructs the in-intent pool for a given intent to include positive examples that that match the given intent. In contrast, the dataset builder 365 constructs the out-intent pool for a given intent to include complement examples (also referred to a negative examples) that do not match the given intent. A developer or the dataset builder 365 may assign the anomalous example 620 to several pools for different intents. For example, an anomalous example 620 that is initially assigned a first intent by the classifier 363 and a second intent by the developer on review (per Block 730) may be added to the out-intent pool for the first intent (i.e., as a complement example per Block 750) and to the in-intent pool for the second intent (i.e., as a positive example per Block 740).

Once the dataset builder 365 has received the labeling feedback for the anomalous examples 620 and has finalized the training dataset 640, the trainer 364 uses the training dataset 630 to train a new classifier 363 or retrain the existing classifier 363 (Block 760). In some embodiments, the dataset builder 365 may perform method 700 every d days, using live conversations gathered and interpreted by the classifier 363 over the last d days. In other embodiments, the dataset builder 365 may perform method 700 every d days, using live conversations gathered an interpreted by the classifier 363 over the last d days and the utterances included in the training dataset 630 used to train a prior iteration of the classifier.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
ranking, according to anomaly scores, a plurality of historic utterances that have been associated by a first classifier with a given intent of a plurality of predefined intents;
identifying an anomaly threshold for the given intent, where the anomaly threshold identifies a distance in a multidimensional space from a collective average value for the plurality of historic utterances in the multidimensional space above which association with the given intent is defined as anomalous and below which association with the given intent is defined as non-anomalous;
verifying by a second classifier that a first utterance from the plurality of historic utterances that has a first anomaly score above the anomaly threshold was correctly associated with the given intent by the first classifier;
verifying by the second classifier that a second utterance from the plurality of historic utterances that has a second anomaly score below the anomaly threshold was incorrectly associated with the given intent by the first classifier;
adding the first utterance to a training dataset as a positive example for the given intent; and
adding the second utterance to the training dataset as a complement example for the given intent.

2. The method of claim 1, wherein ranking according to the anomaly scores further comprises:
creating a corresponding plurality of vector representations for each utterance of the historic utterances using an encoding schema; and
scoring the vector representations to produce a list of anomalous vector representations sorted by score.

3. The method of claim 2, wherein ranking according to the anomaly scores further comprises:
creating a corresponding plurality of second vector representations for each utterance of the historic utterances using a second encoding schema;
scoring the second vector representations to produce a second list of anomalous second vector representations;
determining utterances that are agreed to be anomalous by comparing the list with the second list; and
outputting the agreed utterances as anomalous utterances.

4. The method of claim 2, wherein scoring the vector representations includes one of:
determining a cosine distance to a cluster;
training a one-class support vector machine; and
training an isolation forest.

5. The method of claim 1, wherein the plurality of historic utterances are selected from a plurality of historic conversations, wherein each utterance is determined to be a root dialog node in an associated conversation.

6. The method of claim 1, wherein the plurality of historic utterances include utterances included in a prior iteration of the training dataset used to train a corresponding iteration of the first classifier and live conversations gathered over a time period since the first classifier was last trained.

7. The method of claim 1, further comprising:
retraining the first classifier using the training dataset.

8. A computer readable storage medium storing instructions that when executed by a processor enable the processor to perform an operation, the operation comprising:
ranking, according to anomaly scores, a plurality of historic utterances that have been associated by a first classifier with a given intent of a plurality of predefined intents;
identifying an anomaly threshold for the given intent, wherein the anomaly threshold identifies a distance in a multidimensional space from a collective average value for the plurality of historic utterances in the multidimensional space above which association with the given intent is defined as anomalous and below which association with the given intent is defined as non-anomalous;
verifying by a second classifier that a first utterance from the plurality of historic utterances that has a first anomaly score above the anomaly threshold was correctly associated with the given intent by the first classifier;
verifying by the second classifier that a second utterance from the plurality of historic utterances that has a second anomaly score below the anomaly threshold was incorrectly associated with the given intent by the first classifier;
adding the first utterance to a training dataset as a positive example for the given intent; and
adding the second utterance to the training dataset as a complement example for the given intent.

9. The computer readable storage medium of claim 8, wherein ranking according to the anomaly scores further comprises:
creating a corresponding plurality of vector representations for each utterance of the historic utterances using an encoding schema; and
scoring the vector representations to produce a list of anomalous vector representations sorted by score.

10. The computer readable storage medium of claim 9, wherein ranking according to the anomaly scores further comprises:
creating a corresponding plurality of second vector representations for each utterance of the historic utterances using a second encoding schema;
scoring the second vector representations to produce a second list of anomalous second vector representations;
determining utterances that are agreed to be anomalous by comparing the list with the second list; and
outputting the agreed utterances as anomalous utterances.

11. The computer readable storage medium of claim 9, wherein scoring the vector representations includes one of:
determining a cosine distance to a cluster;
training a one-class support vector machine; and
training an isolation forest.

12. The computer readable storage medium of claim 8, wherein the plurality of historic utterances are selected from a plurality of historic conversations, wherein each utterance is determined to be a root dialog node in an associated conversation.

13. The computer readable storage medium of claim 8, wherein the plurality of historic utterances include utterances included in a prior iteration of the training dataset used to train a corresponding iteration of the first classifier and live conversations gathered over a time period since the first classifier was last trained.

14. The computer readable storage medium of claim 8, further comprising:
retraining the first classifier using the training dataset.

15. A system, comprising:
a processor; and a memory storage device including instructions that when executed by the processor, enable the processor to:
- rank, according to anomaly scores, a plurality of historic utterances that have been associated by a first classifier with a given intent of a plurality of predefined intents;
- identify for the given intent, wherein the anomaly score threshold identifies a distance in a multidimensional space from a collective average value for the plurality of historic utterances in the multidimensional space above which association with the given intent is defined as non-anomalous;
- verify by a second classifier that a first utterance from the plurality of historic utterances that has a first anomaly score above the anomaly threshold was correctly associated with the given intent by the first classifier;
- verify by the second classifier that a second utterance from the plurality of historic utterances that has a second anomaly score below the anomaly threshold was incorrectly associated with the given intent by the first classifier;
- add the first utterance to a training dataset as a positive example for the given intent; and
- add the second utterance to the training dataset as a complement example for the given intent.

16. The system of claim 15, wherein to rank the plurality of historic utterances according to the anomaly scores further the instructions further enable the processor to:
- create a corresponding plurality of first vector representations for each utterance of the historic utterances using a first encoding schema; and
- score the first vector representations to produce a first list of anomalous vector representations sorted by score;
- create a corresponding plurality of second vector representations for each utterance of the historic utterances using a second encoding schema;
- score the second vector representations to produce a second list of anomalous second vector representations;
- determine utterances that are agreed to be anomalous by comparing the first list with the second list; and
- outputting the agreed utterances as anomalous utterances.

17. The system of claim 16, wherein scoring the vector representations includes one of:
- determining a cosine distance to a cluster;
- training a one-class support vector machine; and
- training an isolation forest.

18. The system of claim 15, wherein the plurality of historic utterances are selected from a plurality of historic conversations, wherein each historic utterance is determined to be a root dialog node in an associated conversation.

19. The system of claim 15, wherein the plurality of historic utterances include utterances included in a prior iteration of the training dataset used to train a corresponding iteration of the first classifier and live conversations gathered over a time period since the first classifier was last trained.

20. The system of claim 15, wherein the instructions further enable the processor to:
- retrain the first classifier using the training dataset.

* * * * *